United States Patent [19]
Brown

[11] Patent Number: 5,267,587
[45] Date of Patent: Dec. 7, 1993

[54] UTILITIES SHUTOFF SYSTEM

[76] Inventor: Geoffrey P. Brown, 1923 W. 41st Avenue, Vancouver, British Columbia, Canada, V6M 1Y5

[21] Appl. No.: 864,677

[22] Filed: Apr. 7, 1992

[51] Int. Cl.⁵ ............................................. F16K 31/05
[52] U.S. Cl. ................................ 137/624.12; 137/486; 137/487.5; 137/495
[58] Field of Search .................. 137/486, 495, 624.12, 137/487.5, 456

[56] References Cited

U.S. PATENT DOCUMENTS

| | | |
|---|---|---|
| 3,416,560 | 12/1968 | Bruno . |
| 4,180,088 | 12/1979 | Mallett . |
| 4,249,565 | 2/1981 | Brust . |
| 4,252,088 | 2/1981 | Frisby . |
| 4,589,435 | 5/1986 | Aldrich . |
| 4,730,637 | 3/1988 | White . |
| 4,911,200 | 3/1990 | Ben-Arie ............................. 137/486 |
| 4,926,901 | 5/1990 | Waltenburg .................... 137/486 X |
| 5,004,014 | 4/1991 | Bender ............................. 137/486 X |

Primary Examiner—John Rivell
Attorney, Agent, or Firm—Barrigar & Oyen

[57] ABSTRACT

The present invention provides an automatic monitoring and shutoff system for utilities which allows the user to set the system to permit certain uses of gas or water without triggering the shutoff, depending on whether the user is home or away, and is able to provide for specific usual or unusual uses.

12 Claims, 16 Drawing Sheets

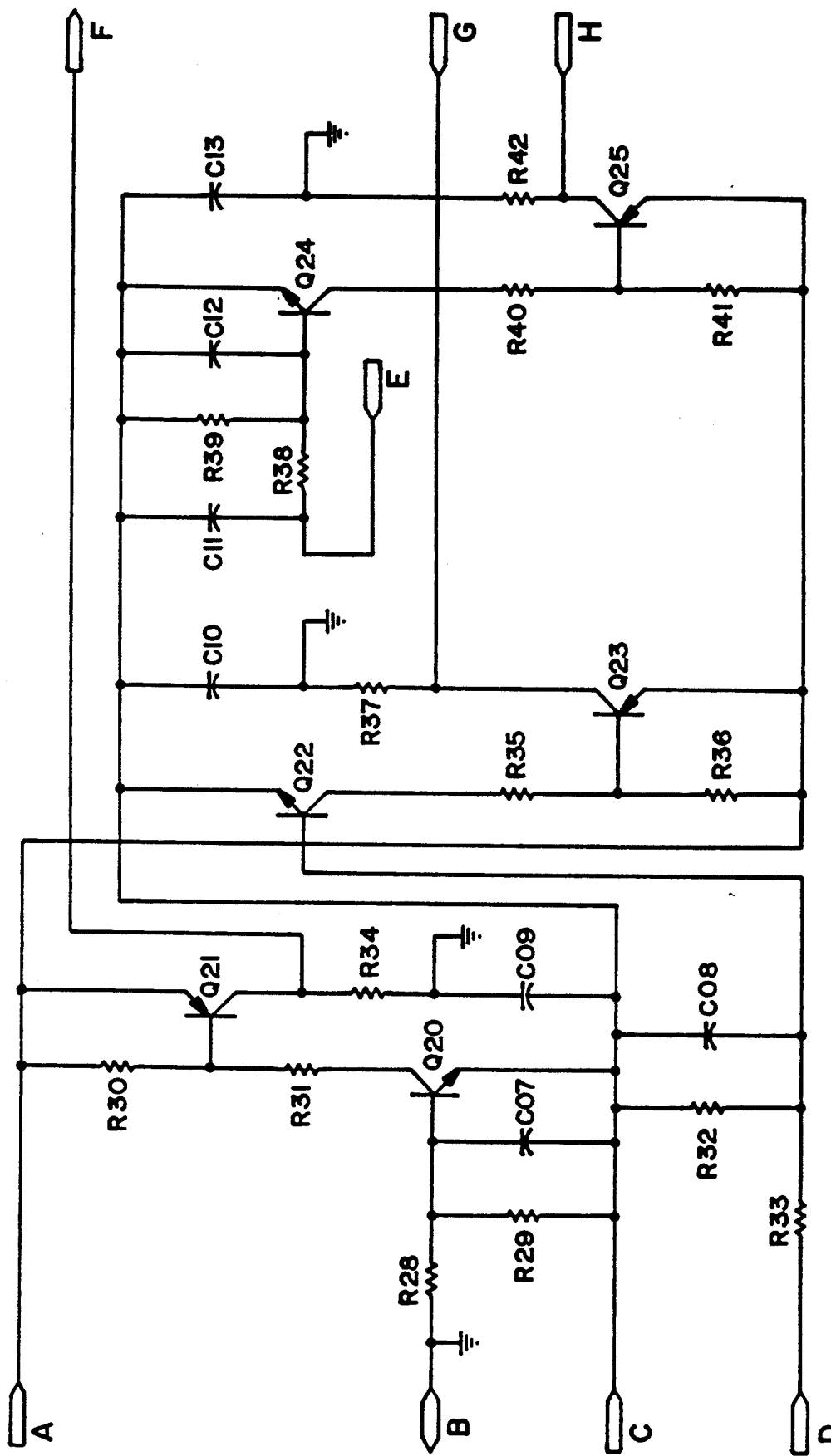
FIG. 2B1

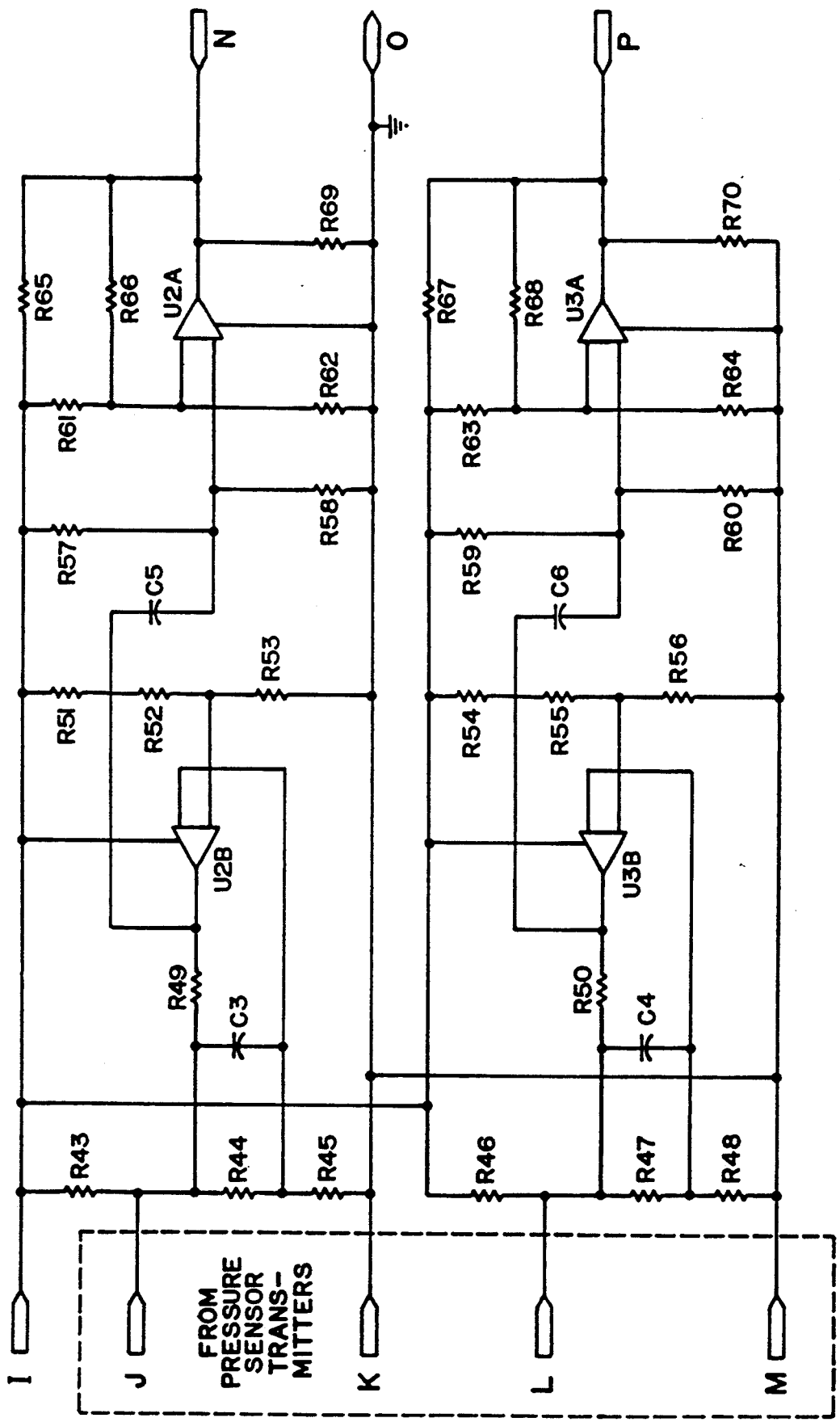
FIG. 2B2

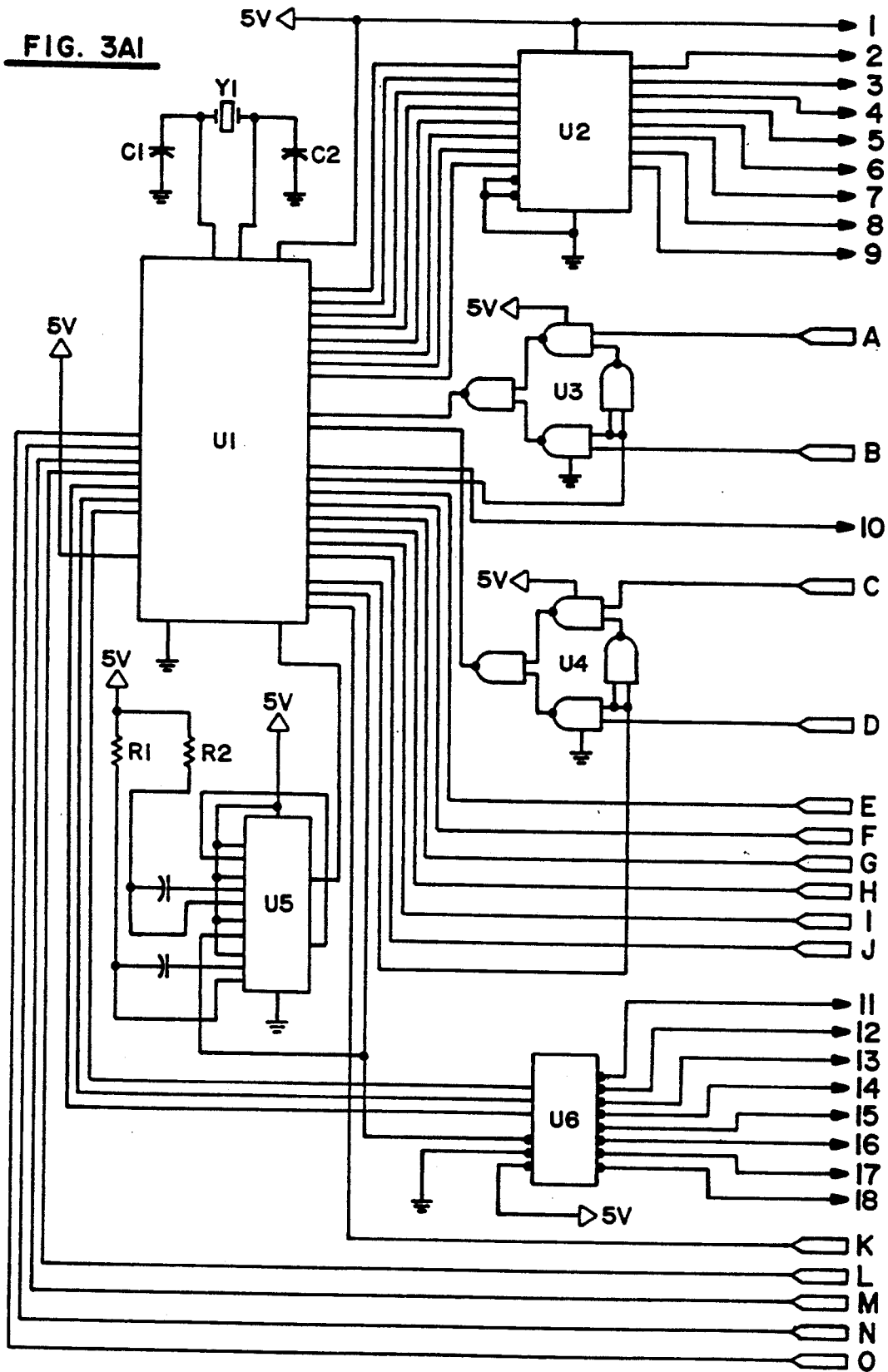
FIG. 3A1

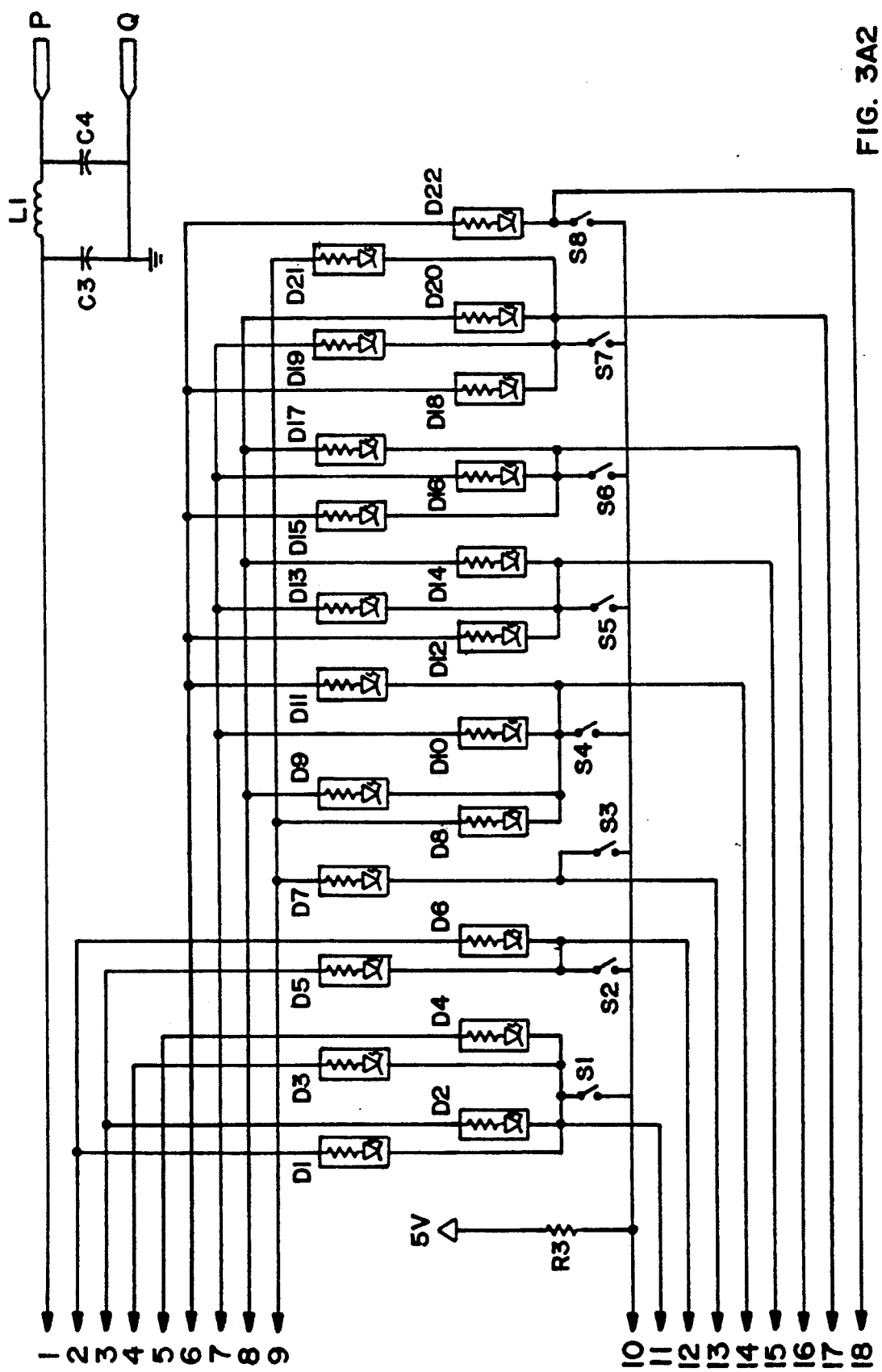
FIG. 3A2

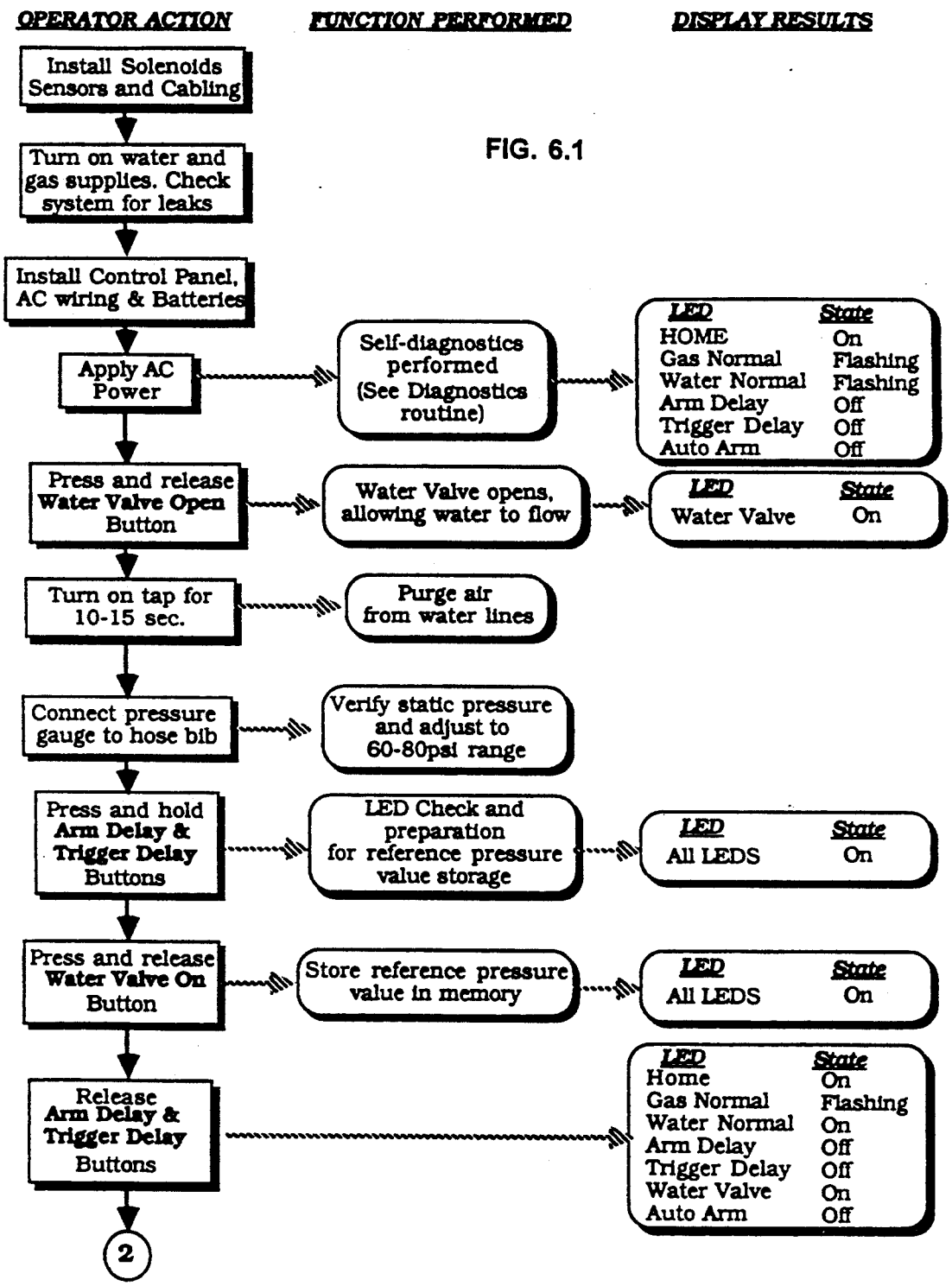
FIG. 6.1

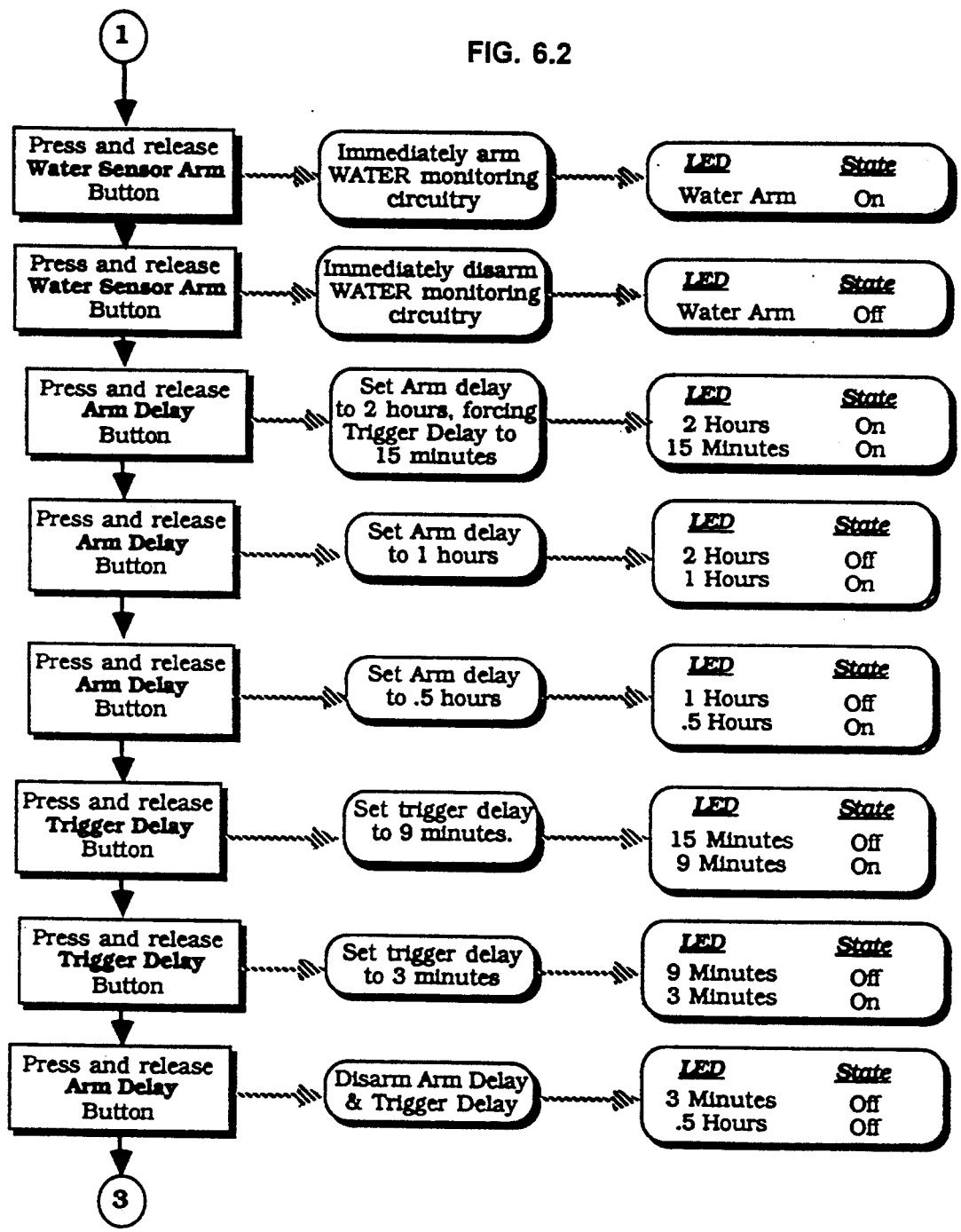
FIG. 6.2

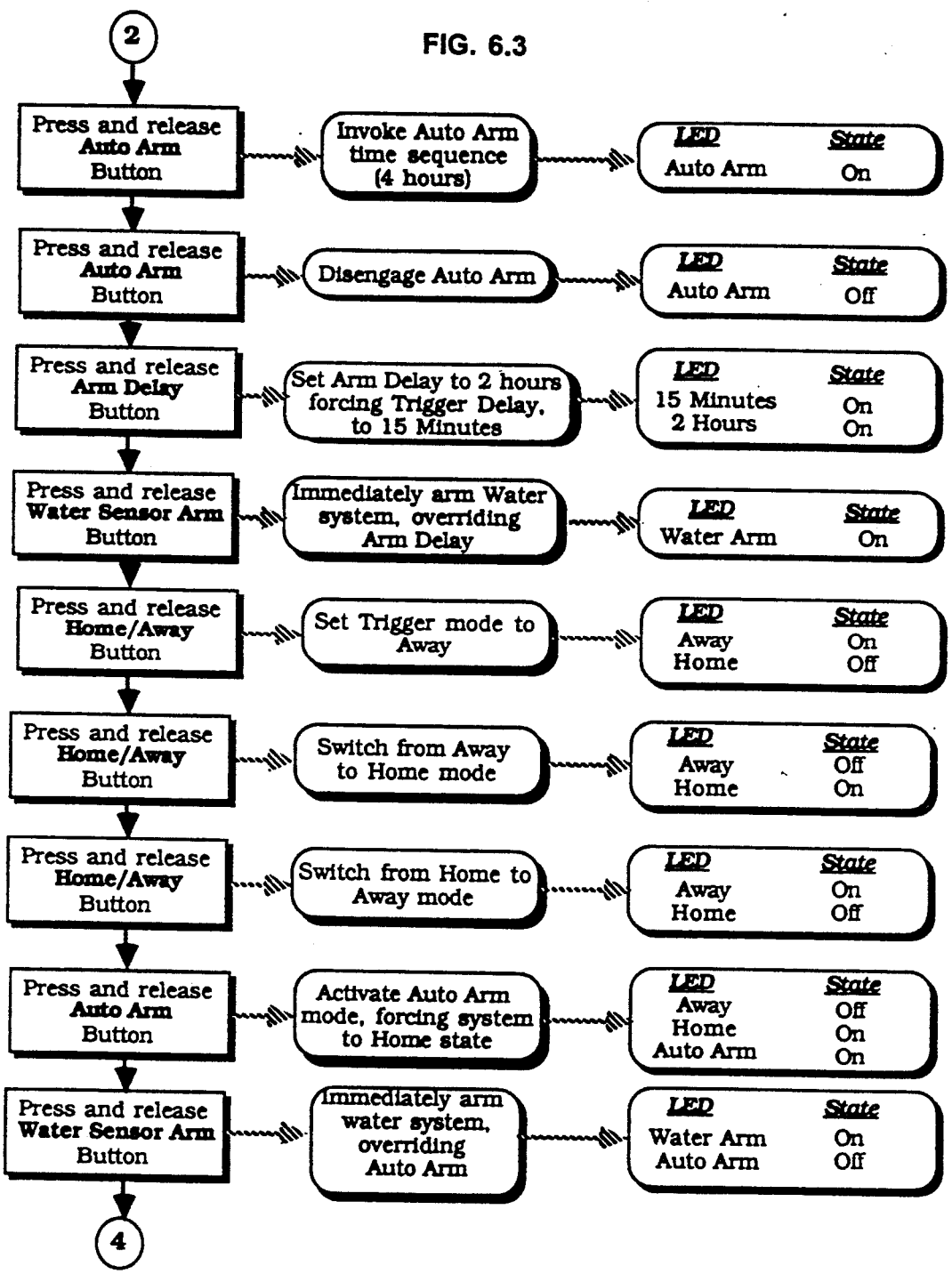

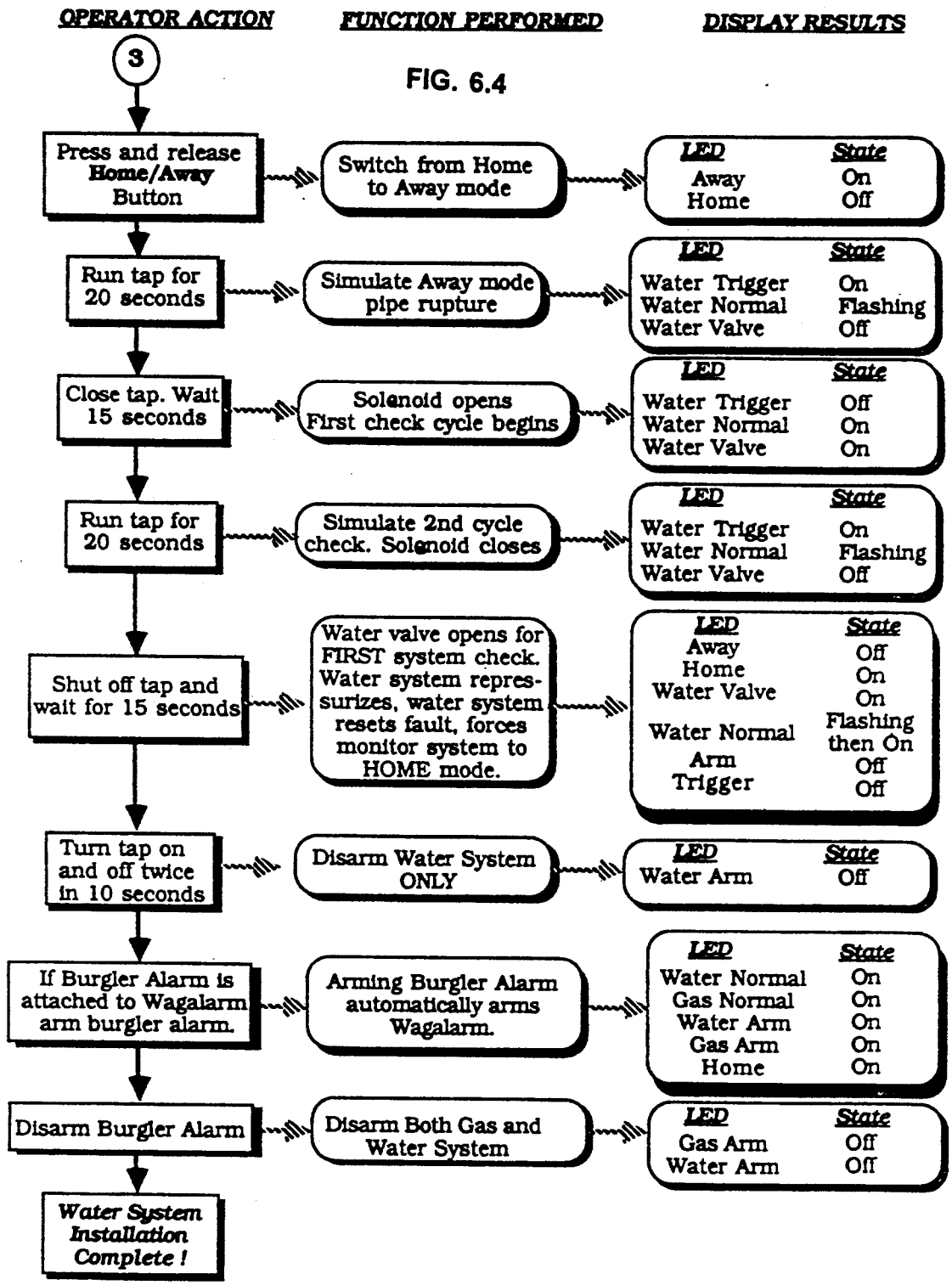
FIG. 6.4

FIG. 6.5
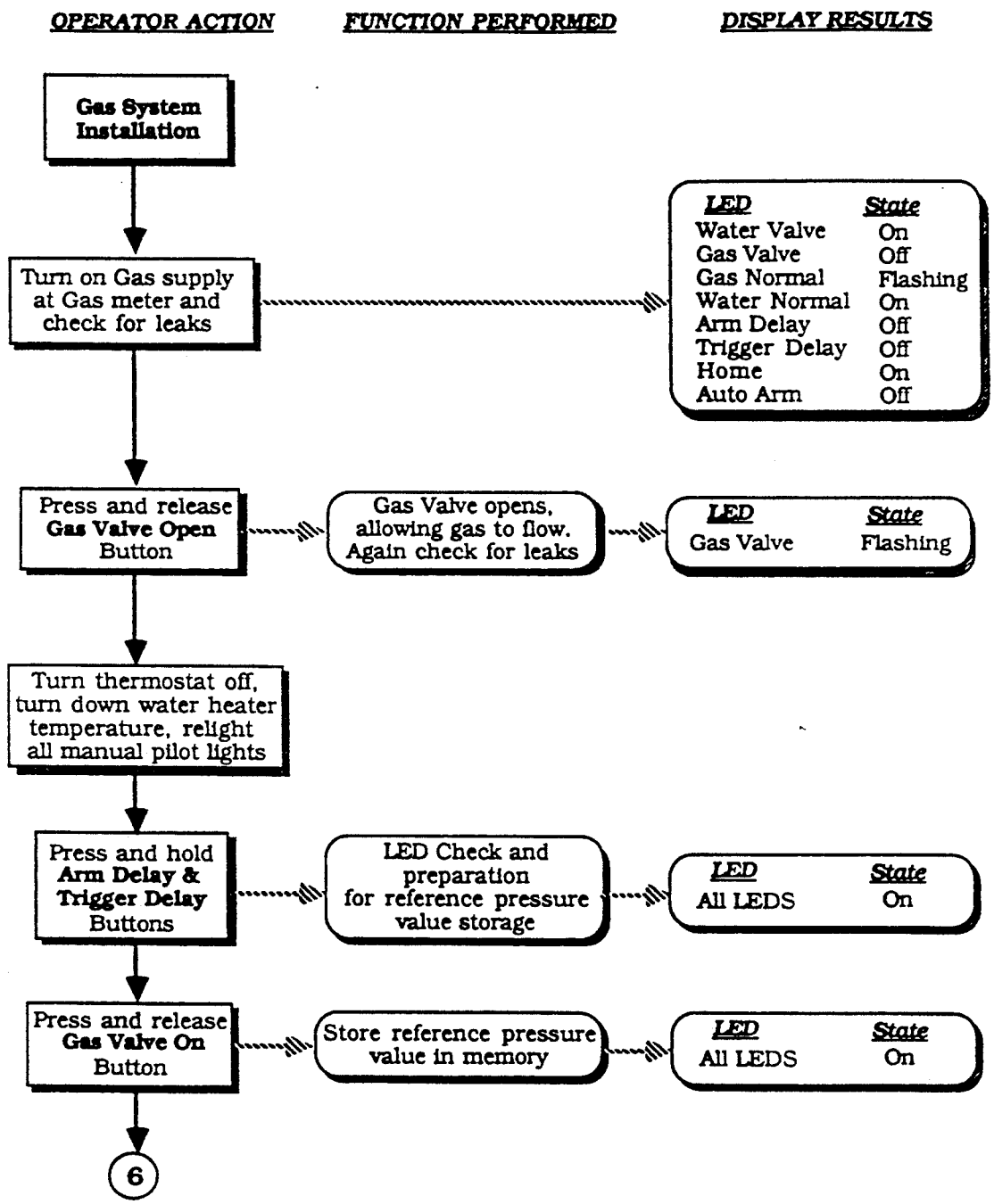

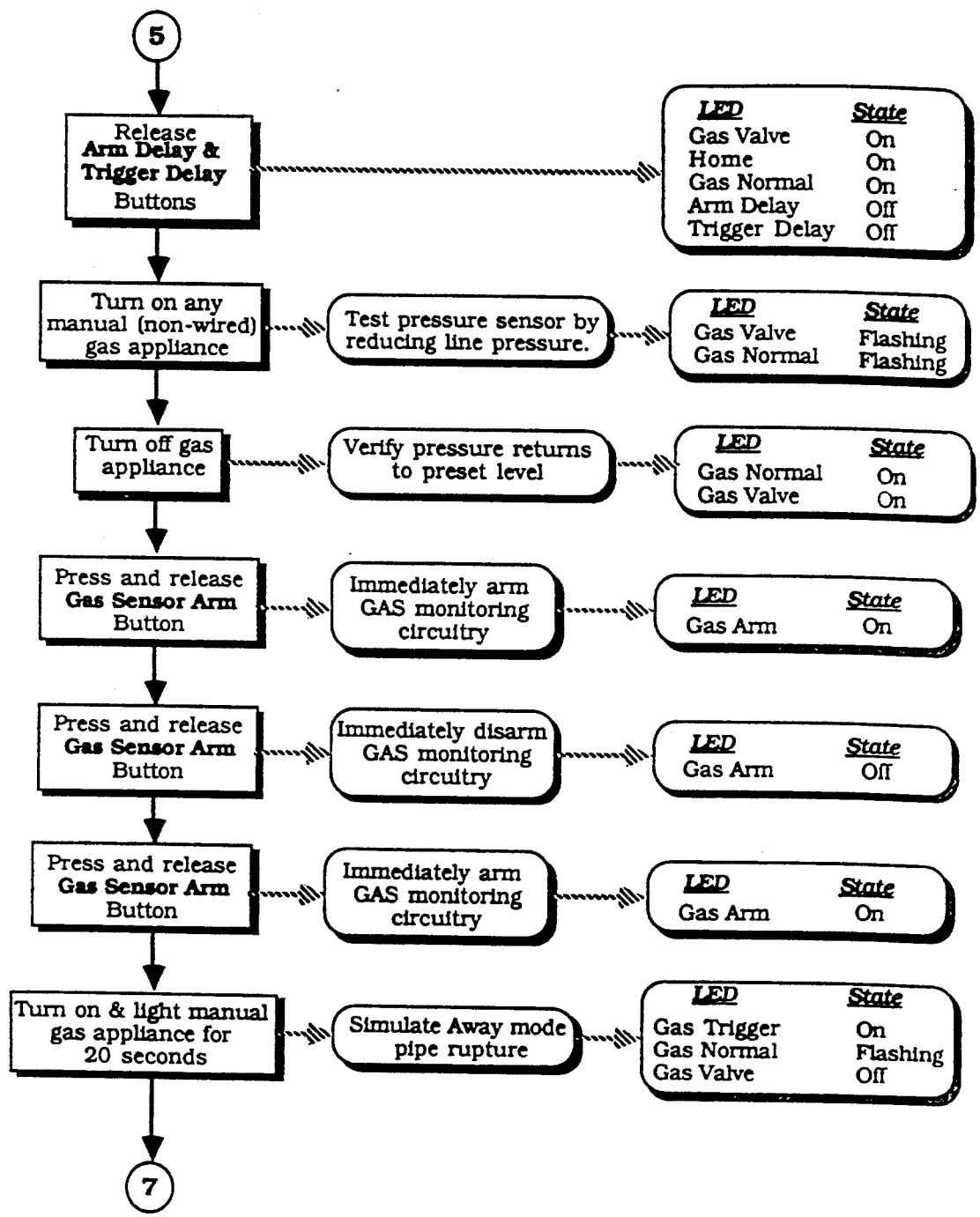
FIG. 6.6

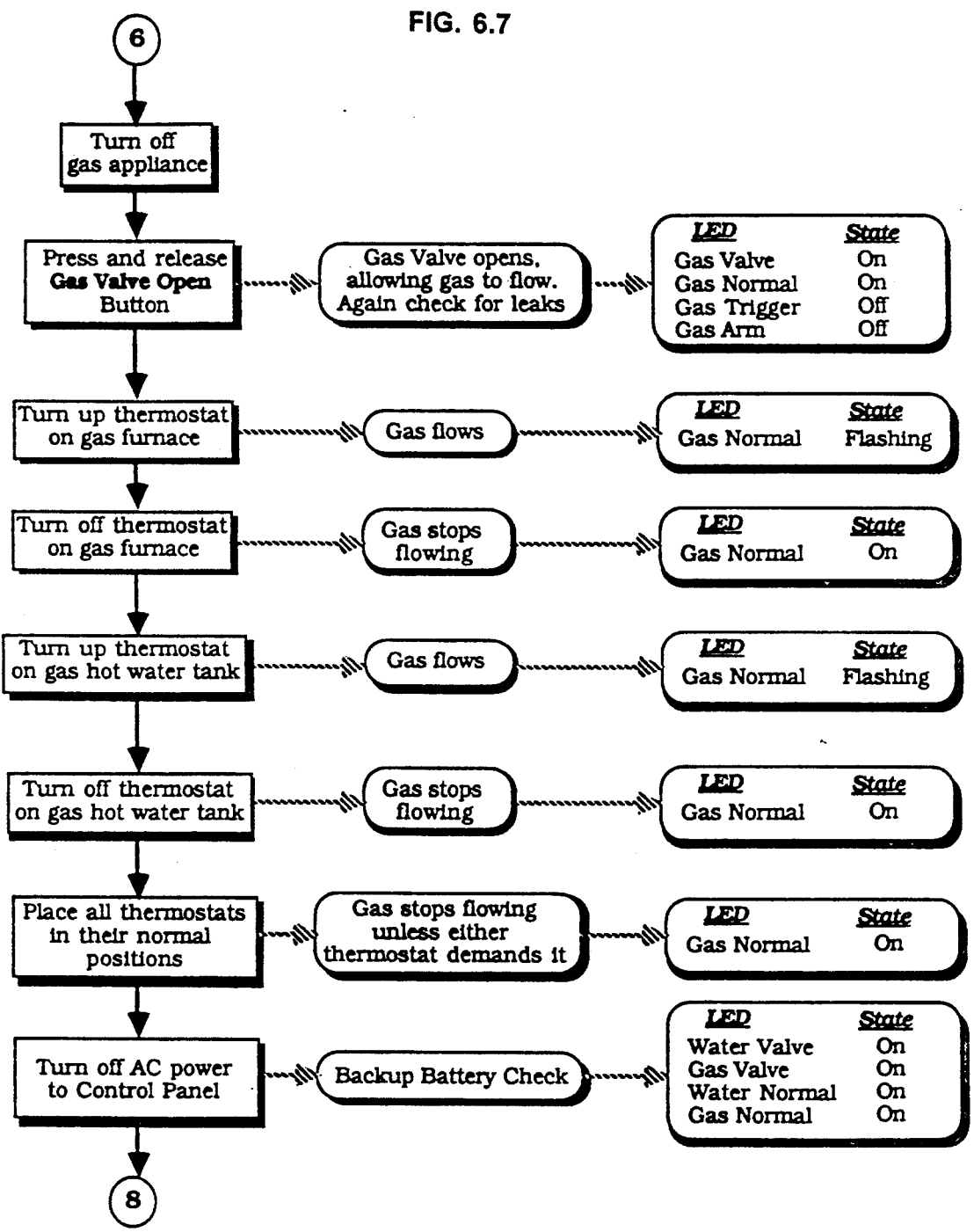
FIG. 6.7

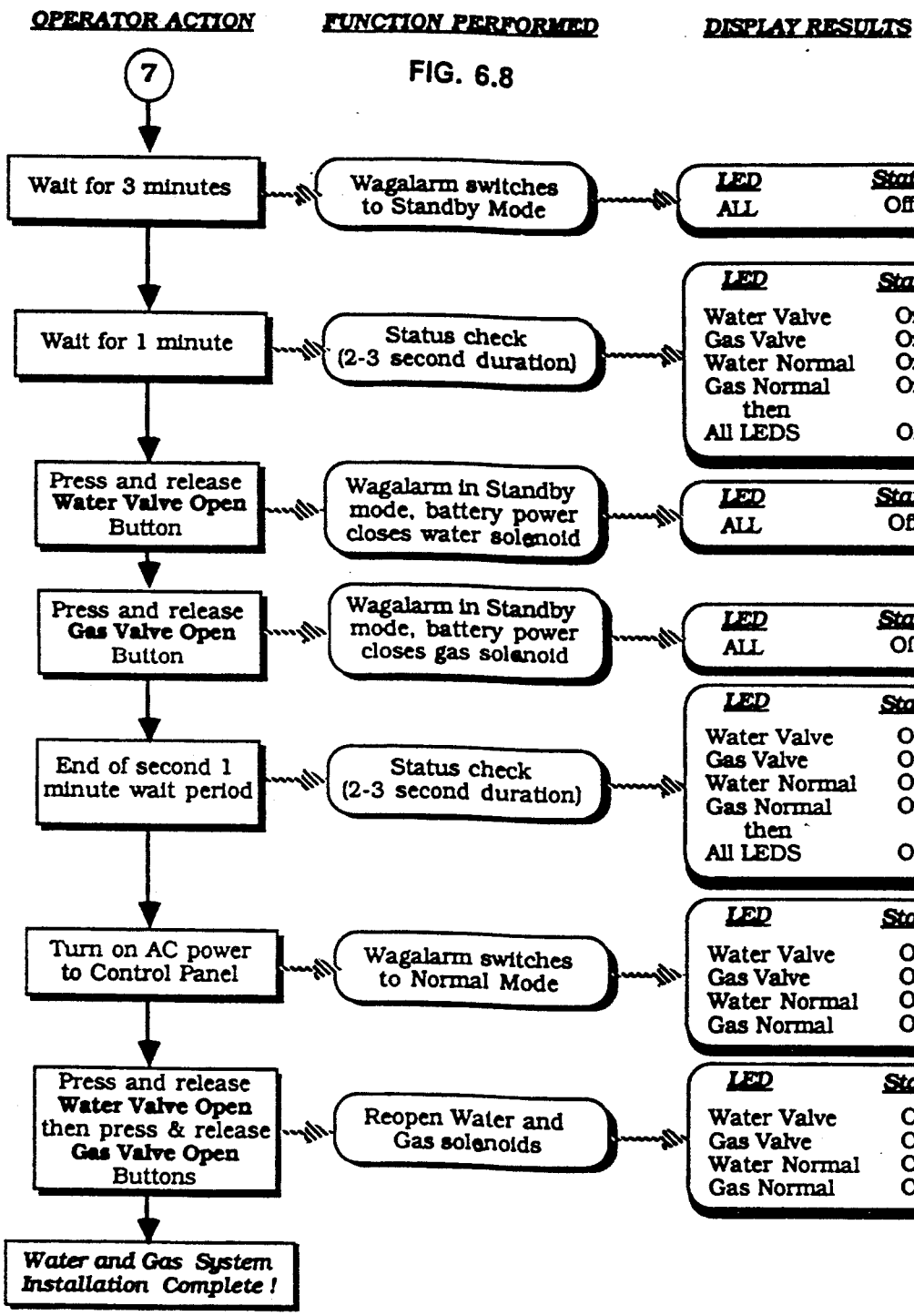
FIG. 6.8

UTILITIES SHUTOFF SYSTEM

BACKGROUND OF THE INVENTION

The present invention relates to systems for automatically shutting off water supply, natural gas or other utilities in the event of unexpected leakage.

While a home-owner will typically shut off water and gas utilities in a home, cottage or ski chalet when leaving the residence unoccupied for an extended period, this will often not be done when the residence is left unoccupied for a shorter period, perhaps a weekend or even several weeks and is never done at night while the residence is occupied. However, if a water or gas leak occurs during the vacant period or overnight, considerable damage can be done, even over a very short period. Leaks might be caused by freezing or breakage of pipes, for example, or an earthquake.

Various systems have been designed to automatically shut off water or gas supplies to a household in the event of earthquakes or leakage. Some of these are triggered by the tremors of the earthquake. Others rely on sensing a flow in the water line. For example, U.S. Pat. No. 3,416,560 issued Dec. 17, 1968 to Bruno discloses a fluid leak monitoring apparatus which comprises a housing with a chamber therein divided into a small diameter intake chamber and a larger diameter outlet chamber. A piston is mounted in the larger chamber so that it faces downstream. A drop in the water pressure downstream due to a leak causes the piston to move in the downstream direction, throwing a switch which activates a shutoff valve.

U.S. Pat. No. 4,180,088 issued Dec. 25, 1979 to Mallett discloses another water shutoff system in which a fluid flow sensor causes water and gas supplies to be shut off when water flow is sensed and the circuit is set to automatic mode, but not otherwise. U.S. Pat. No. 4,249,565 issued Feb. 10, 1981 to Brust and U.S. Pat. No. 4,589,435 issued May 20, 1986 to Aldrich disclose timed water shutoff systems in which water is permitted to flow for a pre-set period of time before the shutoff valve is activated. Finally, U.S. Pat. No. 4,730,637 issued Mar. 15, 1988 to White discloses another water and gas shutoff system which uses a central processing unit to monitor data concerning fluid flow and temperature in the pipes and, based on the data, decides when to shut the supply of fluid to the system.

The above referenced devices cannot determine the status of the utility line once they have triggered. Utility line monitoring is not possible with sensing devices that return to equilibrium when flow stops whether under normal conditions or abnormal conditions such as voiding of the utility line after line failure and triggering of the line shut off valve. Such systems would have to be electrically activated in order for their sensing device to determine the presence or absence of flow. Building codes specifically prohibit such automatic resetting for the gas utility line and undesirable flooding could occur from the water line.

White addresses this problem for one type of potential failure in the water line by suggesting temperature measurement and trigger line shut off and water system draining. This differs from commercially available temperature monitoring alarm systems in as much as it allows for draining and the charging of the water line when the sensing condition has passed. Presumably if some problem has occurred such as earthquake failure or freezing due to inadequate draining caused by line vacuum and water tension that occurs when a non-vented line is drained, the White device would then function similarly to other flow sensing devices.

SUMMARY OF THE INVENTION

The present invention provides an automatic utilities shutoff system for shutting off a water or gas supply line in the event of line leakage or breakage, which comprises:

a) valve means for opening and closing the water or gas supply line;

b) control means for controlling the valve means;

c) means for sensing a pressure change in the water or gas supply line caused by flow in the water or gas supply line;

d) means for the sensing means to send a signal to the control means;

e) system arming means to selectively cause the control means to close the valve in response to a signal indicating a flow in the water or gas supply line;

f) first trigger time delay means for activating said control means to close said valve after a predetermined duration of flow in said supply lines;

g) second trigger time delay means for overriding said first trigger time delay with second trigger time delay for a predetermined period of time;

h) means for setting a variable time period for which said second trigger time delay overrides said first trigger time delay; and i) automatic arming means to selectively activate said arming means and said time delays in response to a signal indicative of lack of flow in said supply line.

BRIEF DESCRIPTION OF THE DRAWINGS

In drawings which illustrate a preferred embodiment of the invention:

FIG. 2A, 2B1 and 22B are schematic diagrams of the electrical circuit for the power supply and sensor receivers, including the battery monitor, AC test, pressure signal and data receivers circuit;

FIG. 3A1, 3A2 and 3B is a schematic diagram of the electrical circuit for the operator control panel;

FIG. 6.1, FIG. 6.2, FIG. 6.3, FIG. 6.4, FIG. 6.5, FIG. 6.6, FIG. 6.7 and FIG. 6.8 are the components of a block flow diagram showing the installation and operation of the invention.

DETAILED DESCRIPTION OF A PREFERRED EMBODIMENT

Figure 1:
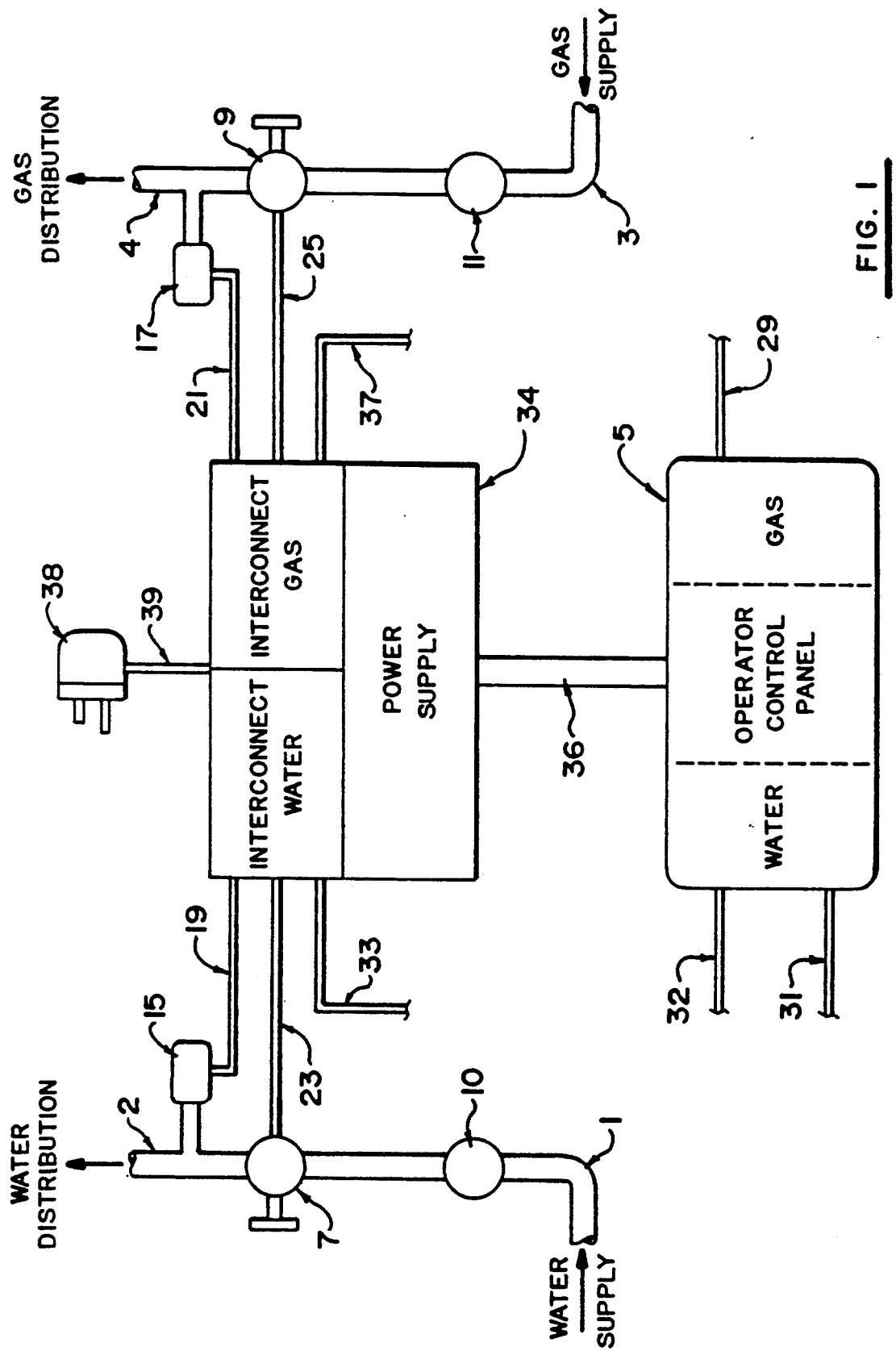
FIG. 1 is a schematic drawing of the various components of the system of the invention.
Figure 2A:
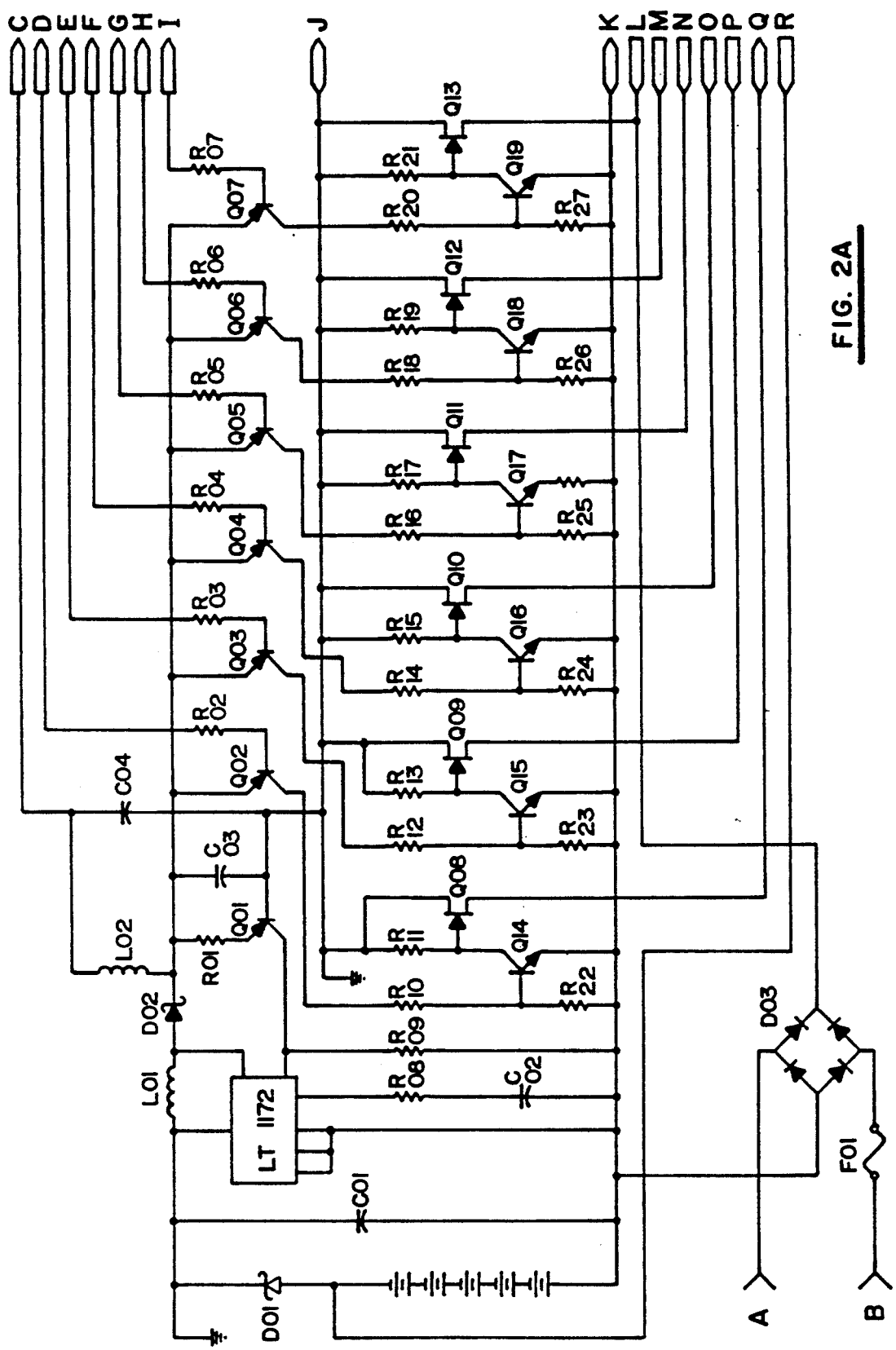

With reference to FIG. 1, incoming water supply line 1 and incoming gas supply line 3 provide water and gas supply respectively to a residential home or commercial business through distribution lines 2 and 4. Water and gas lines 1 and 3 are monitored and controlled by control panel 5 which contains a microprocessor containing the chip memory from which actions by the control panel are determined. Alternatively, control panel 5 is connected to the central computer of a "smart house" which contains the executable code. Pressure reducing valves 10 and 11 reduce the respective supply line pressures to a preset fixed value usually determined by the building codes. Solenoid valves 7 and 9 are positioned in the respective lines to permit the lines to be shut off upstream of the distribution lines 2 and 4. Water pressure sensor 15 and gas pressure sensor 17 are installed to sense pressure drops on the downstream side of solenoid valves 7 and 9. Sensors 15 and 17 are not in-line in the water and gas lines and so do not impede flow. They are electrically connected by conductors 19 and 21 respectively to interconnect/power supply box 34 and then to control panel 5 by electrical conductors 36, and provide a continuing signal indicative of line pressure. Solenoid valves 7 and 9 are electrically connected to control panel 5 via conductors 23 and 25 to the interconnect/power supply box 34 and electrical conductors 36 from interconnect box 34 to control panel 5, and provide a continuing signal indicative of valve position. Conductors 29 connect a burglar alarm circuit to control panel 5. Conductors 31 connect a thermostat circuit to control panel 5. Conductors 33 connect sprinkler and other electrically operated water system circuits to the control panel and conductors 37 connect gas furnace, gas hot water heater and other electrically operated gas system circuits. Signals from the electrically operated appliances can be wireless radio frequency controlled, eliminating the necessity for electrical conduits 33 and 37. 12-volt AC power is supplied to the interconnect/power supply box 34 by lines 39 from transformer 38, or from batteries in interconnect/power box 34. The control panel 5 is powered via conductors 36 from the interconnect/power supply box 34.

Figure 5:
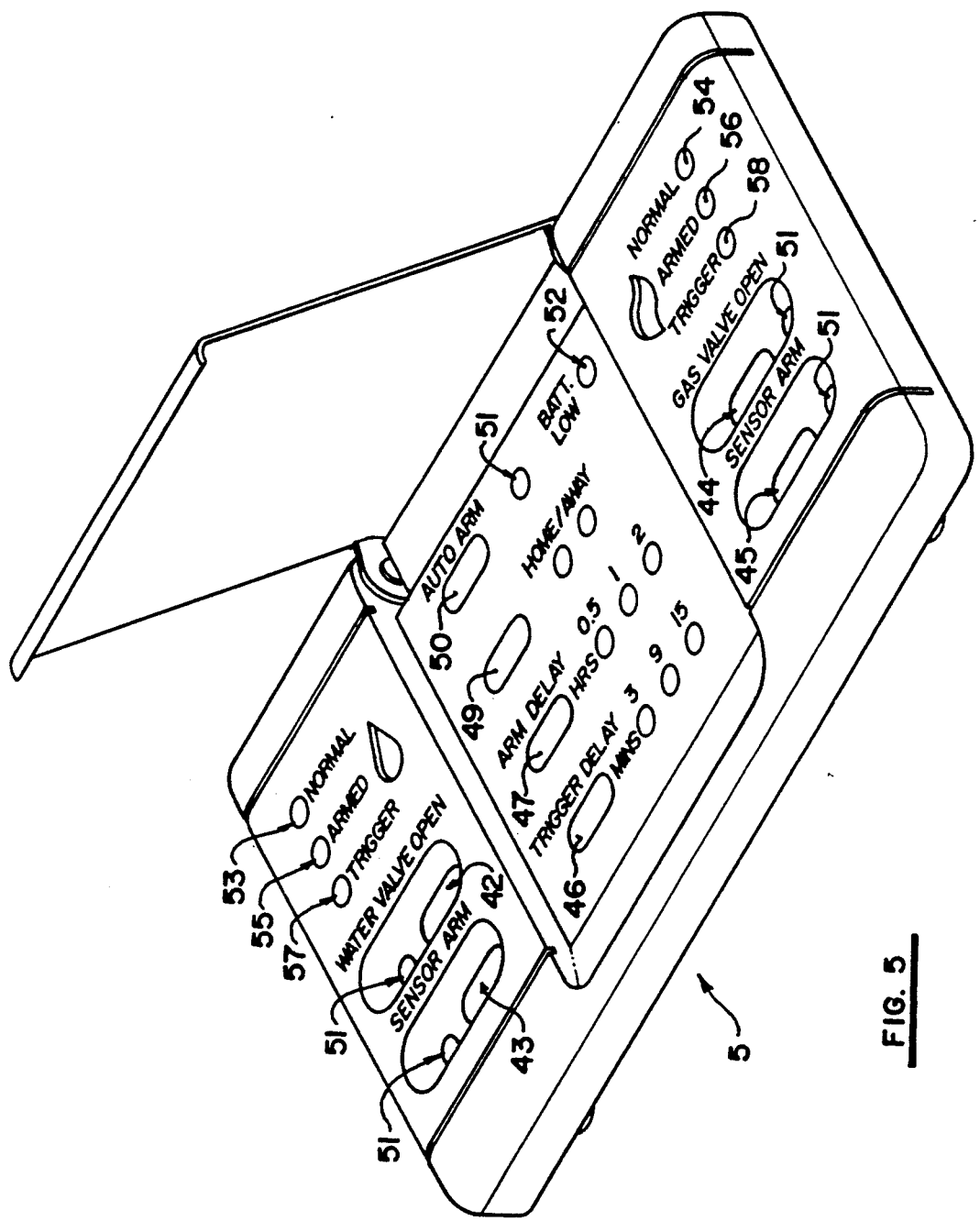
FIG. 5 is a perspective view of the control panel of the invention.

With reference to FIG. 5, the following functions are provided on the control panel:

1. WATER ON/OFF switch 42 opens or shuts solenoid valve 7.
2. GAS ON/OFF switch 44 opens or shuts solenoid valve 9.
3. WATER SENSOR ARMING switch 43 arms the automatic shutoff circuit for the water line with a 3 minute or 20 second trigger delay depending on whether switch 49 is in the HOME or AWAY position and disarms without delay.
4. GAS SENSOR ARMING switch 45 arms the automatic shutoff circuit for the gas line with a 20 second trigger delay and disarms without delay.
5. VARIABLE TRIGGER DELAY switch 46 permits setting of a water line trigger delay from 3, 9 or 15 minutes for the arm delay period (set on dial 47) when the arm delay feature is activated and has one of the time period indicator lights illuminated.
6. VARIABLE ARM DELAY switch 47 permits setting of a water line arm delay from no delay, 30 minutes, 1 hour or 2 hours at the trigger delay on dial 46.
7. HOME/AWAY switch 49 permits the activation of the home/away feature which controls the water line trigger delay of the armed system.
8. AUTOMATIC ARM select switch 50 activates the device to progressively arm itself after lack of use for the period shown on dial 47 of the ARM DELAY setting. When this time period passes and the AUTOMATIC ARM feature activates, the device will then default the HOME/AWAY switch to the HOME condition and behaves the same as if it was armed by the ARM/DISARM switches 43 and 45 in the HOME condition.
9. LOW BATTERY LIGHT 52 flashes when the back up battery needs replacing.
10. INDICATOR LIGHTS 53 and 54 indicate when the water or gas sensors are powered respectively. Lights 53 and 54 will flash if the signal received does not equal the calibrated signal. Indicator lights 55 and 56 indicate when the water or gas circuits respectively are armed for automatic shutoff. Indicator lights 57 and 58 indicate when the water or gas shutoff circuits respectively have been triggered. Switches 42, 43, 44, 45 and 50 each has an indicator light 51 which is lit when the switch is activated.

The opening of switches 42 or 44 overrides the automatic circuit to shut the water and gas lines off respectively. The closing of WATER ARMING switch 43 overrides the ARM DELAY and AUTOMATIC ARM SWITCH and arms the water system without delay. When the arm switches 43 and 45 are closed, the flow of water or gas is governed by the automatic shutoff systems. Deactivation of the automatic shutoff system by switches 43 or 45 places the systems in normal operation. When these systems are activated and sensors 15 and 17 sense a pressure change indicating a fluid flow, the control panel 5 selectively causes the solenoid valves 7 or 9 to be closed unless the selected flow conditions cease within a trigger time delay set by the HOME/AWAY switch 49 unless the ARM DELAY switch 48 has been activated in which case the trigger delay for the water line will be that set on TRIGGER DELAY switch 46 for the ARM DELAY switch 47 time delay setting and then will automatically change to the TRIGGER TIME DELAY set by the HOME/AWAY switch 49.

When the analyzed flow and time delay conditions meet the control panel micro-processor memory trigger conditions, the solenoid is closed the first time and the device commences the close down procedure. Ten seconds after the solenoid valve closes, it will open in order that the sensing device may monitor the line. If the device determines that the line is normal, it will cease the close down procedure and remain open. If the device determines that there is a problem, it will continue with the close down procedure.

The microprocessor analyzes the pressure drop signal and makes an initial determination whether the pressure drop results from normal or abnormal water flow. The action initiated by control panel 5 is selectively based on this determination. Control panel 5 under certain conditions will initiate system checks to assist in the determination of the flow conditions.

Figure 4:
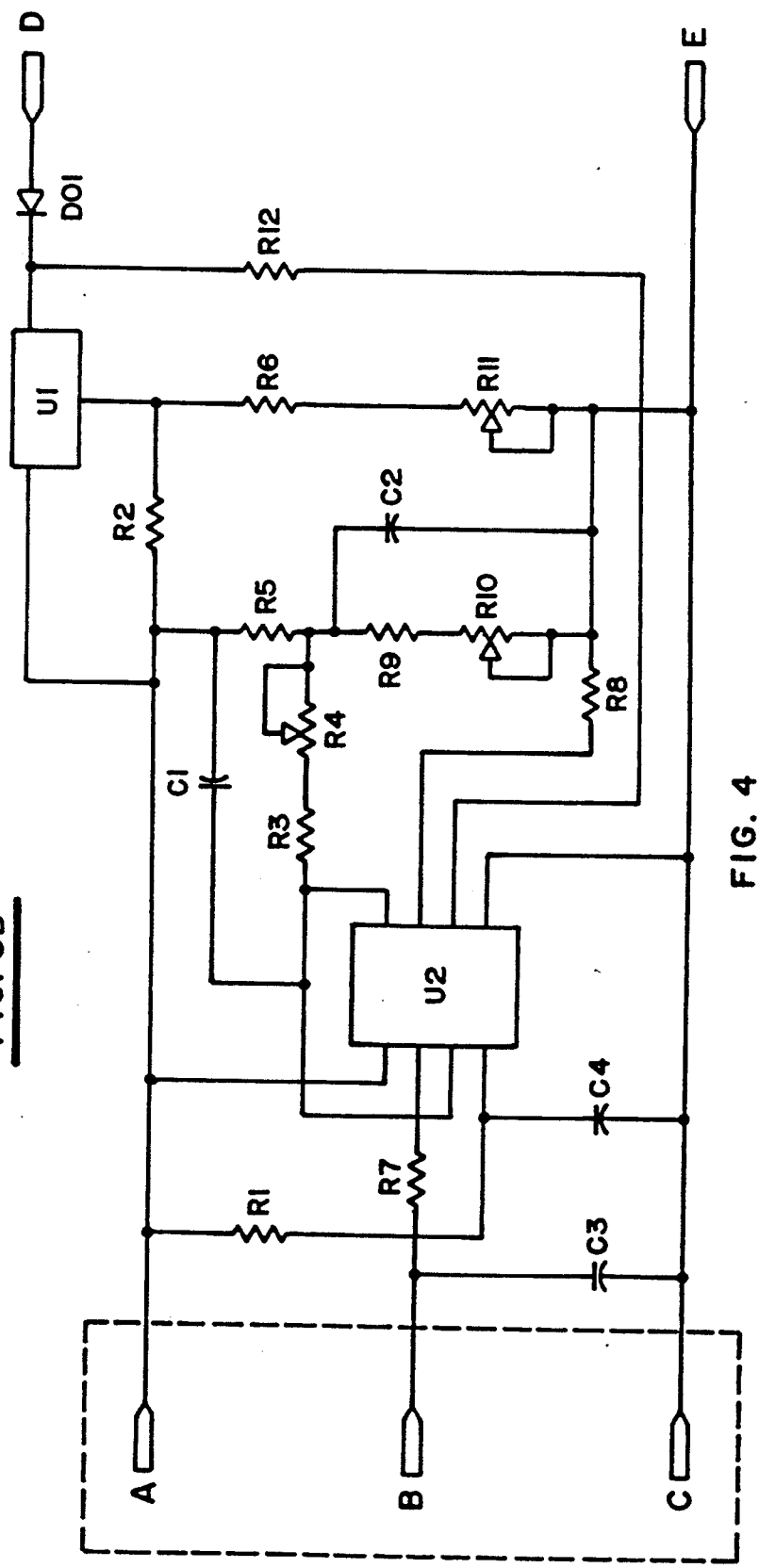
FIG. 4 is a schematic diagram of the electrical circuit for the pressure data transmitter which conditions the signal from the pressure transducer.
Figure 3B:
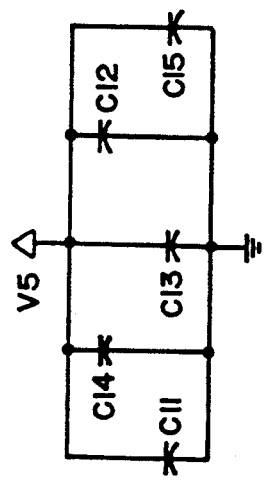

The preferred water pressure sensing device consists of a pressure transducer with a temperature compensation signal conditioner. One port for the sensor is mounted in the neck of a standard Venturi to amplify the flow signal and increase the sensitivity of the system. The device is connected to the Venturi in a differential manner and senses both static pressure and Venturi amplified changes in velocity pressure. The preferred gas pressure sensing device also consists of a pressure transducer with a temperature compensated signal conditioner. The device is connected to a Venturi in a differential manner and senses both static pressure and Venturi amplified changes in velocity pressure. Such devices can be manufactured from pressure transducers manufactured by Honeywell, Motorola and Sensym. Honeywell has developed the temperature compensated signal conditioner for the device used in this system. Honeywell's part no. is X95608-PC for gas and X94056-PC for water. A circuit diagram for the signal conditioner component is shown in FIG. 4.

As will be seen, the present invention uses sensors which are not mounted in the flow of water or gas as in the prior art shutoff systems and therefore, does not impede flow. Losses from a properly designed Venturi are negligible. The sensors can continue to monitor whether conditions are normal even when there is no flow and will clearly indicate if there is no pressure, unlike prior art systems.

Looking first at the water shutoff system, in the event the ARM DELAY switch 47 is "off" and the HOME/AWAY switch 49 is set to "home", the delay from commencement of water flow in the system to water shutoff will be a preset time, say 3 minutes, which allows for nocturnal uses such as toilet flushing, etc. If the HOME/AWAY switch 49 is set to "away", then the delay will be much shorter, say 20 seconds, since no uses will be expected other than automatic ice makers or evaporative surges from float controlled devices. If the ARM DELAY switch 47 is "on", then the trigger delay will be the time set on the TRIGGER DELAY dial 46 (between 3, 9 or 15 minutes) for a period of time set on the ARM DELAY dial 47 (0.5, 1 or 2 hours) after which time the delay will revert to the standard HOME or AWAY settings of 3 minutes or 20 seconds.

In the simple case, for example, the householder is leaving the house for an extended period and thus places the HOME/AWAY switch in the "away" position and arms the system. Now any flow of water of greater than 20 seconds duration will cause the water supply close down procedure to be initiated. On returning home, he places the switch in the "home" position which now allows a 3 minute flow when the system is armed at night to allow for toilet flushing and the like. If there will be an unusual nocturnal use extending longer than 3 minutes, say a householder bathes, then the ARM DELAY switch can be activated. It will accommodate a longer flow (3 to 15 minutes) without shutting off the system, and this extended delay feature will remain active for a limited duration as selected on ARM DELAY switch 47. After that time, the delay reverts to the preset HOME or AWAY delay.

The microprocessor in control panel 5 in fact analyzes the pressure signals caused by the water flowing and is programmed to make a determination whether the flow conditions are normal or abnormal. The control means may cause system checks to occur in this determination procedure. If the control means determines the pressure drop is due to normal use or supply line pressure drop, it will selectively override the "simple case" and operate in a "WATCH" condition until it receives a calibrated pressure signal indicating the line condition has returned to normal reference.

The water line shut off system will accept and allow a signal 33 from an automatic sprinkler system to override the shut off system as long as the integrity of the water line has not been breached or the water line shut off prior to the sprinkler signal being received. Similarly, a gas furnace and gas hot water heating system can be wired directly into the gas shutoff system via conductor 37 and if the gas line has not been breached and shut off by the shutoff system prior to the signal being received from such an appliance, then the signal will override the shutoff system.

Should catastrophic failure occur while such directly wired appliances are operating and overriding the gas shutoff system, the appliance sensing pilot will shut down the appliance gas solenoid valve thereby removing the overriding signal to the gas line shutoff system which will set the 20 second gas system trigger delay timer going. If the gas line pressure does not normalize within that 20 second period, the gas line shutoff system will close the gas line solenoid valve, cutting off the gas flow to the house.

The utility shut off system can be directly wired to the HOME/AWAY switch on the house thermostat by electrical conduit 31. The HOME/AWAY switch could then be optionally controlled from the thermostat if more convenient for the householder's routine, or the house heating and air conditioning is controlled by a central processor as in the "smart house" concept. This feature of remote control for the HOME/AWAY condition can also be directly controlled by an automatic thermostat, such that when the thermostat temperature set back of a programmable thermostat which would typically be at night or in the day time when the house is unoccupied, the signal controlling the set back will arm the shutoff system.

The system can be interchangeably armed and disarmed by the ARM/DISARM switches on the monitoring panel, remotely electrically or by arming or disarming a burglar security system into which it can be directly wired and selectively coupled or decoupled by depressing a three button sequence on monitoring panel 5. The water utility line can also be disarmed by a water pulse from any tap in the water line as long as the system's integrity is sound. An example of this use would be: "normal settings" of HOME/AWAY set at "HOME", ARM DELAY—"on", settings TRIGGER DELAY dial—"9 minutes", ARM DELAY dial—"1 hour". Householder turns on dishwasher, sets burglar alarm which automatically engages utility line devices, householder washes and goes to bed. In the morning, householder uses the water pulse to disarm water line device, has shower and then comes out and disarms burglar alarm which disarms gas line device.

The system can be set by the AUTOMATIC ARM switch 50 to arm itself based on non-use of the water system for a set period of time. The AUTOMATIC ARM delay in the embodiment shown, uses the same time setting as for the ARM DELAY, although a separate timer could be used for this feature. If the AUTOMATIC ARM switch 50 is "on", at the expiration of the time period shown on the ARM DELAY dial 47, the system will behave as if it had been armed through the ARM/DISARM switch 43 with the TRIGGER DELAY and ARM DELAY switches determining the trigger and arm delays as previously discussed, except that if the water is used normally (for a time period shorter than the TRIGGER DELAY dial setting), the automatic arm feature will reset to the beginning of the first time delay period and will not activate again unless there is no use for the set time period.

There is a greater use for the AUTOMATIC ARM feature than just the added insurance for those who forget to arm. For example, a neighbour could disarm the water line through the water pulse means, without disturbing the burglar security alarm or gas utility line system, water the gardens, and the system would automatically rearm itself in the time period shown on the ARM DELAY dial 47.

The gas shutoff system works in similar fashion, although the default setting for both home and away delay would be about 20 seconds. The water line automatic arm signal would trigger the gas line arming signal.

The utility shutoff system can be controlled by an external computer which has been programmed with the code necessary to operate the device. An increasing number of residences have a central computer controlling such processes as heating, air conditioning and burglar security. The present utility shut off system can be operated by such a correctly programmed central computer through connections 32 to the control panel 5.

Electrical Circuit Description

FIG. 2A, 2B1 and 2B2 is a circuit diagram illustrating the power supply 34. The Power system is comprised of three sections; the Power Conversion section, the Fault Monitor section, and the Solenoid Driver section.

POWER CONVERSION

The Power Conversion section receives primary system power input from an external, AC transformer power source. A secondary, internal battery source provides backup power in the event of an interruption in the normal utility supplied AC source. To conserve battery power, the pressure signal is monitored only intermittently while operating on battery power.

The external source provides a voltage which in turn is used to energize the water and gas solenoids. In addition, the externally supplied voltage is further conditioned to supply 5 volt logic system power through the use of a DC to DC converter.

The battery backup source is of sufficient magnitude to permit a drop in voltage at the input of the converter (as a result of normal battery degradation) without loss of 5 volt regulation to the logic system.

The primary element in the Power Conversion section is item L01, the switching voltage regulator. The device is configured as a negative to positive, boost converter, through the incorporation of components L01, D02, R01, R09, R08, C02, C03 and Q01. Diode D01 provides isolation of the two input power sources which allows the AC to DC source to predominate over that of the battery backup source. Capacitors C01 and C04 and inductor L02 are used to provide noise immunity and/or to maintain output regulation.

FAULT MONITORS

The Fault Monitor section has the capability of indicating three fault conditions that may occur in the Power Conversion section:

AC-OFF, when active, indicates that the AC transformer power source is no longer supplying input power to the DC to DC converter. (The input power is being supplied by the battery backup source). Through the voltage divider network R38 and R39, the presence or absence of the AC to DC input source is detected and provides the proper input bias to turn Q24 ON or OFF respectively. R40, R41, R42, and C13 provide the proper biasing and voltage translation to turn Q25 ON or OFF in response to the state of Q24. These latter components also yield a system compatible TTL Voltage swing. C11 and C12 provide input signal filtering.

LOW BATTERY, when active, indicates that the battery backup, input voltage is low enough to warrant battery replacement. Through the voltage divider network R32 and R33, a predetermined low battery input source level is detected and provides the proper input bias to turn Q22 OFF as a result. R35, R36, R37, and C10 provide the proper biasing and voltage translation to turn Q23 ON or OFF in response to the state of Q22. These latter components also yield a system compatible TTL voltage swing. C07 and C08 provide input signal filtering.

BATTERY FAULT, when active, indicates that the battery backup, input voltage is too low to sustain normal system operation. Through the voltage divider network R28 and R29, a predetermined lower battery input source level is detected and provides the proper input bias to turn Q20 OFF as a result. R30, R31, R34, and C09 provide the proper biasing and voltage translation to turn Q21 ON or OFF in response to the state of Q20. These latter components also yield a system compatible TTL voltage swing. C11 and C12 provide input signal filtering.

SOLENOID DRIVERS

The solenoid drive section comprises four identical circuits, driven by four separate input control lines:

Gas On—R06, R18, R19, and R26 provide proper biasing and voltage level translation to turn Q06 and Q18 ON and OFF in response to the voltage level of the input control signal, Gas On. Q12 turns ON and OFF in response to the switched state of Q18. Q12 is a high current, FET switching device which is used to activate the Gas Open solenoid.

Gas Off—R05, R16, R17, and R25 provide proper biasing and voltage level translation to turn Q05 and Q17 ON and OFF in response to the voltage level of the input control signal, Gas Off. Q11 turns ON and OFF in response to the switched state of Q17. Q11 is a high current, FET switching device which is used to activate the Gas Close solenoid.

$H_2O$ On—R04, R14, R15, and R24 provide proper biasing and voltage level translation to turn Q04 and Q16 ON and OFF in response to the voltage level of the input control signal, $H_2O$ On. Q10 turns ON and OFF in response to the switched state of Q16. Q10 is a high current, FET switching device which is used to activate the Water Open solenoid.

$H_2O$ Off—R03, R12, R13, and R23 provide proper biasing and voltage level translation to turn Q03 and Q15 ON and OFF in response to the voltage level of the input control signal, $H_2O$ Off. Q09 turns ON and OFF in response to the switched stage of Q15. Q09 is a high current, FET switching device which is used to activate the Water Close solenoid.

Operator Control Panel Operation

FIG. 3A1, 3A2 and 3B illustrates a circuit diagram for the operator control panel 5. The heart of the Operator Control Panel is a Z86C21 8-bit microcontroller, containing the operating control program in non-volatile read-only memory (ROM). The program not only controls the inputs and outputs of the console but also lights the appropriate panel indicators (LED-1-LED20), as appropriate, by way of U2 and U6. The timing for the program is established by Y1, C1, and C2, forming a crystal oscillator circuit.

U2 (74LS244) is used as a current amplifier, providing sufficient current to light LED1-LED20 on the front panel. In order to minimize the number of control lines and reduce power consumption, the LEDs are lit at different times based on the output configuration of U6 (74L8190). This multiplexer allows only one of its outputs to drop to a low logic state at any one time, based on the state of the input lines from U1. During the time that a U6 output line is low and the appropriate output from U1 is at a logic high level, the LED connected between them will light. Internal resistors in the LED package limit the current flow for that LED.

U1's program sequences through all combinations of U6, allowing each LED to be lit, as appropriate. Due to the repetition rate of this scan sequence, the LEDs appear to the human eye to the constantly lit, even though they are each lit for approximately ⅛ of the scan cycle.

During the same time that a LED is being lit, U1 can detect the closure of the appropriate front panel switch (S1-S8). When the appropriate output of U6 goes low, the SWIN line of U1 is pulled from a high logic state to a low state, allowing U1 to "sense" the switch closure. When the switch is released, the SWIN line is pulled to an inactive or high state by R3 connected to +5 V.

U5 (74LS123) monitors the activity of the MUX enable line from U1 to U6, R1, R2, C9 and C10 provide fixed timing for the monitoring function. If the MUX Enable line is inactive longer than the preset time interval, U5 will activate the RESET line of U1, thus restarting the program in U1.

U3 (74C00) is used as a single-chip multiplexor, allowing two separate sensor lines to be monitored by the same input line of U1, based on the logic state of Sensor MUX1. Likewise, U4 (74C00) multiplexes two sensor outputs to another input of U1 based on the logic state of sensor MUX2.

L1, C3 and C4 are used to filter power supply fluctuations entering the operator console. Capacitors C11-C15 are used to further filter noise from the power supply before it reaches the ICs next to which they are mounted.

FIG. 6.1, FIG. 6.2, FIG. 6.3, FIG. 6.4, FIG. 6.5, FIG. 6.6, FIG. 6.7 and FIG. 6.8 is a flow chart illustrating in detail the installation and testing procedures for the invention.

As will be apparent to those skilled in the art, various modifications and adaptations of the structure above described may be made without departing from the spirit of the invention, the scope of which is to be constructed in accordance with the accompanying claims.

BOARD CONNECTOR LEGEND

| FIGURE | LETTER | CONNECTOR | LINE |
|---|---|---|---|
| 2A | A | TB004-01 | |
| | B | TB004-02 | |
| | C | TB002-01 | +5 VDC |
| | D | TB002-11 | SENSOR PWR |
| | E | TB002-04 | WATER OFF |
| | F | TB002-05 | WATER ON |
| | G | TB002-07 | GAS OFF |
| | H | TB002-06 | GAS ON |
| | I | TB002-09 | TSTAC |
| | J | TB002-02 | GND |
| | K | B- | |
| | L | AC | |
| | M | TB005-01 | GAS ON |
| | N | TB005-03 | GAS OFF |
| | O | TB005-04 | WATER ON |
| | P | TB005-06 | WATER OFF |
| | Q | SNRPWR | SENSOR PWR |
| | R | BATT FAULT | BATT FAULT |
| 2B1 | A | +5 VDC | |
| | B | GND | |
| | C | D- | |
| | D | BATT FAULT | |
| | E | AC | |
| | F | TB02-13 | LOW BATTERY |
| | G | TB02-12 | BATTERY FAULT |
| | H | TB02-14 | AC OFF |
| 2B2 | I | SNRPWR | |
| | J | TB05-11 | WSNR (+) |
| | K | TB05-12 | WSNR (−) |
| | L | TB05-13 | GSNR + |
| | M | TB05-14 | GSNR − |
| | N | TB02-16 | WSNR |
| | O | GND | |
| | P | TB02-03 | GSNR |
| 3A1 | A | H20 SENSOR | |
| | B | GAS SENSOR | |
| | C | GAS APPLIANCE | |
| | D | BURGLER IN | |
| | E | WATER APPLIANCE | |
| | F | WATER HALL OUT | |
| | G | GAS HALL OUT | |
| | H | AC OFF | |
| | I | LOW BATTERY | |
| | J | BATTERY FAULT | |
| | K | P36 | |
| | L | WCLIN | |
| | M | WOPIN | |
| | N | GOPIN | |
| | O | GCLIN | |
| 3A2 | P | +5 V IN | |
| | Q | GROUND | |
| | A | PRS SNR | +12V |
| | B | PRS SNR | OUT |
| | C | PRS SNR | GND |
| | D | OUTPUT + | |
| | E | OUTPUT − | |

COMPONENT LEGEND

| FIGURE | COMPONENT | VALUE |
|---|---|---|
| 2A | R01-R07 | 50K |
| | R08 | 2.2K |
| | R09 | 56K |
| | R10-R27 | 50K |
| | L01 | 50 μH |
| | L02 | 100 μH |
| | D01-D02 | MBR330 |
| | D03 | BRIDGE |
| | Q01-Q07 | 2N3906 |
| | Q08-Q13 | IFRD 9020 |
| | Q14-Q19 | 3904 |
| | C01 | 220 μF |
| | C02 | 0.01 μF |
| | C03-C04 | 220 μF |
| | F01 | FUSE 2 A SLO |
| 2B1 | R28 | 1.0M |
| | R29 | 40K |
| | R30 | 470K |
| | R31 | 2.2M |
| | R32 | 47K |
| | R33 | 1.0M |
| | R34-R35 | 2.2M |
| | R36 | 470 |
| | R37 | 2.2M |
| | R38 | 1.0M |
| | R39 | 47K |
| | R40 | 2.2M |
| | R41 | 470K |
| | C07-C08 | 0.01 μF |
| | C09-C11 | 220 μF |
| | C12 | 0.01 μF |
| | C13 | 220 μF |
| | Q20 | 2N3904 |
| | Q21 | 2N3906 |
| | Q22 | 2N3904 |
| 2B1 | Q23 | 2N3906 |
| | Q24 | 2N3904 |
| | Q25 | RNB906 |
| 2B2 | R42 | 2.2M |
| | R43 | 18 |
| | R44 | 100K |
| | R45 | 10K |
| | R46 | 18 |
| | R47 | 100K |
| | R48 | 10K |
| | R49-R50 | 560 |

-continued

|  |  |  |
|---|---|---|
|  | R51 | 4.7K |
|  | R52 | 100K |
|  | R53 | 10K |
|  | R54 | 4.7K |
|  | R55 | 100K |
|  | R56 | 10K |
|  | R57 | 100K |
|  | R58 | 22K |
|  | R59 | 100K |
|  | R60 | 22K |
|  | R61 | 100K |
|  | R62 | 27K |
|  | R63 | 100K |
|  | R64 | 27K |
|  | R65 | 10K |
|  | R66 | 1M |
|  | R67 | 10K |
|  | R68 | 1M |
|  | R69-R70 | 6.8K |
|  | C3-C6 | 0.01 μF |
| 3A1 | R1 | 100 kΩ |
|  | R2 | 10 kΩ |
|  | C1,C2 | 15 pf |
|  | U1 | Z86C21 MCU |
|  | U2 | 74LS244 |
|  | U3 | 74C00 |
|  | U3,U4 | 74C00 |
|  | Y1 | 12.000 MHz |
| 3A2 | R3 | 1 MΩ |
|  | D1 | WVO LED |
|  | D2 | WTrig LED |
|  | D3 | WArm LED |
|  | D4 | WN LED |
|  | D5 | Wlogo LED |
|  | D6 | WSA LED |
|  | D7 | GSA LED |
|  | D8 | GVO LED |
|  | D9 | GTrig LED |
|  | D10 | GArm LED |
|  | D11 | GN LED |
|  | D12 | 0.5 LED |
|  | D13 | 1.0 LED |
|  | D14 | 2.0 LED |
|  | D15 | 3 LED |
|  | D16 | 9 LED |
|  | D17 | 15 LED |
|  | D18 | Home LED |
|  | D19 | Away LED |
|  | D20 | Low Batt LED |
|  | D21 | Glogo LED |
|  | D22 | A'Arm LED |
|  | S1 | WVOS |
|  | S2 | WVAS |
|  | S3 | GVAS |
|  | S4 | GVOS |
|  | S5 | ADS |
|  | S6 | TDS |
|  | S7 | HA |
|  | S8 | AArm |
|  | L1 | 100 μH |
|  | C3,C4 | 100 μF |
| 3B | C11-C15 | 0.01 μF |
|  | R1 | 6.8K (TEMP STABLE) |
|  | R2 | 240 |
|  | R3 | 91K (TEMP STABLE) |
|  | R4 | 50K FS SET (TEMP STABLE) |
|  | R5 | 22K |
|  | R6 | 1K |
|  | R7 | 100K |
|  | R8 | 16.5K (TEMP STABLE) |
|  | R9 | 620 |
|  | R10 | 2K NULL SET |
|  | R11 | 500 Vr SET |
|  | R12 | 2.7K |
|  | C1 | 0.47 μF |
|  | C2, C3 | 0.1 μF |
|  | C4 | 0.0047 μF (TEMP STABLE) |
|  | U1 | LM317 LZ |

-continued

|  |  |  |
|---|---|---|
|  | U2 | RC 4152 |

I claim:

1. An automatic shutoff system for a water or gas supply line comprising:
   a) valve means for opening and closing said water or gas supply line;
   b) control means for controlling said valve means;
   c) means for sensing a pressure change in said water or gas supply line caused by flow in said water or gas supply line;
   d) means for said sensing means to send a signal to said control means;
   e) system arming means to selectively cause said control means to close said valve in response to a signal indicating a flow in said water or gas supply line;
   f) first trigger time delay means for activating said control means to close said valve after a predetermined duration of flow in said water or gas supply line;
   g) second trigger time delay means for overriding said first trigger time delay with second trigger time delay for a predetermined period of time; and
   h) means for setting a variable time period for which said second trigger time delay overrides said first trigger time delay.

2. The system of claim 1 further comprising:
   j) means for automatically analyzing supply line pressure and calibrating control means for varying supply line pressures.

3. The system of claim 1 further comprising:
   k) water pulse disarming means to selectively disarm said system arming in response to a signal indicative of a flow in said line for a predetermined period of time.

4. The system of claim 1 further comprising
   l) means for remote activation of said system arming means.

5. The system of claim 1 further comprising:
   m) means for magnetically maintaining said valve in its open or closed position.

6. The system of claim 1 further comprising:
   n) monitoring panel means for operation and display of said system and automatic arming and each said time delay means.

7. The system of claim 1 further comprising:
   o) means for overriding said system arming means by a control signal.

8. The system of claim 1 further comprising:
   p) means for manually opening said valve.

9. The system of claim 1 wherein said control means and sensing means are electrically operated, further comprising a source of AC power and auxiliary battery means, and means for selective monitoring of said pressure sensing means when said system is operating on said battery power.

10. The system of claim 1 further comprising:
    q) monitoring means for determining whether said valve is in its magnetically maintained open or closed position.

11. The system of claim 1 further comprising:
    i) automatic arming means to selectively activate said system arming means and each said time delay means in response to a signal indicative of lack of flow in said supply line.

12. The system of claim 1 comprising both water and gas supply lines.

* * * * *